US008062459B2

(12) United States Patent
Nakakado et al.

(10) Patent No.: US 8,062,459 B2
(45) Date of Patent: Nov. 22, 2011

(54) VELOCITY-CHANGING APPARATUS FOR WEB

(75) Inventors: Masaki Nakakado, Osaka (JP); Akihiro Miyoshi, Osaka (JP)

(73) Assignee: Zuiko Corporation, Osaka (JP)

( * ) Notice: Subject to any disclaimer, the term of this patent is extended or adjusted under 35 U.S.C. 154(b) by 0 days.

(21) Appl. No.: 12/791,099

(22) Filed: Jun. 1, 2010

(65) Prior Publication Data

US 2010/0282812 A1 Nov. 11, 2010

Related U.S. Application Data

(63) Continuation of application No. 10/598,265, filed as application No. PCT/JP2005/003355 on Mar. 1, 2005, now abandoned.

(30) Foreign Application Priority Data

Mar. 5, 2004 (JP) ................................ 2004-061518

(51) Int. Cl.
*B32B 37/00* (2006.01)
*B32B 38/00* (2006.01)
*B32B 38/04* (2006.01)

(52) U.S. Cl. ......... 156/256; 156/250; 156/252; 156/253

(58) Field of Classification Search .................. 156/250, 156/252, 253, 256, 510, 516, 517, 543, 580.1
See application file for complete search history.

(56) References Cited

U.S. PATENT DOCUMENTS 3,827,358 A 8/1974 Budai
4,366,753 A 1/1983 Glanz et al.
4,793,564 A 12/1988 Hank et al.
4,863,086 A 9/1989 Armelin
4,972,743 A 11/1990 Nojima
4,997,120 A 3/1991 Tanaka et al.

(Continued)

FOREIGN PATENT DOCUMENTS

DE 24 03 748 8/1975

(Continued)

OTHER PUBLICATIONS

International Search Report for corresponding Application No. PCT/JP2005/003355 mailed Apr. 19, 2005.

(Continued)

*Primary Examiner* — Mark A Osele
*Assistant Examiner* — Christopher C Caillouet
(74) *Attorney, Agent, or Firm* — Renner, Otto, Boisselle & Sklar, LLP

(57) ABSTRACT

A velocity-changing apparatus of the present invention includes: a drum 3 for transporting the continuous web W1 at a transport velocity which is generally equal to a circumferential velocity V(θ) of the drum 3 while changing the circumferential velocity V(θ) periodically at least once per one rotation of the drum 3; a movable member 2 disposed upstream of the drum 3 for feeding the continuous web W1 to the drum 3,; and a cutter 4 for cutting, on the drum 3, the continuous web W1 being transported at the transport velocity which is generally equal to the circumferential velocity V(θ) of the drum 3. The movable member 2 moves according to the change of the circumferential velocity V(θ) of the drum 3 so that a feed velocity at which the continuous web W1 is fed to the drum 3 is generally equal to the transport velocity of the continuous web W1 being transported by the drum 3.

7 Claims, 7 Drawing Sheets

U.S. PATENT DOCUMENTS

| | | | | |
|---|---|---|---|---|
| 5,377,891 | A | 1/1995 | Peltzer et al. | |
| 5,407,513 | A | 4/1995 | Hayden et al. | |
| 6,596,108 | B2 | 7/2003 | McCabe | |
| 6,763,749 | B2 * | 7/2004 | Droste et al. | 83/37 |
| 6,783,622 | B1 * | 8/2004 | Backlund et al. | 156/250 |
| 6,820,671 | B2 * | 11/2004 | Calvert | 156/543 |
| 7,383,865 | B2 * | 6/2008 | Umebayashi et al. | 156/350 |
| 2001/0042591 | A1 | 11/2001 | Milner et al. | |
| 2002/0103468 | A1 | 8/2002 | Nakakado et al. | |
| 2003/0047273 | A1 | 3/2003 | Kojo et al. | |
| 2003/0066585 | A1 | 4/2003 | McCabe | |

FOREIGN PATENT DOCUMENTS

| | | | |
|---|---|---|---|
| EP | 1 302 424 | A2 | 4/2003 |
| JP | 1977-020564 | | 2/1977 |
| JP | 01-288556 | | 11/1989 |
| JP | 06-143192 | | 5/1994 |
| JP | 07-237805 | | 9/1995 |
| JP | 1997-509128 | | 9/1997 |
| JP | 2002-345889 | | 12/2002 |
| JP | 2003-508243 | | 3/2003 |
| JP | 2003-145485 | | 5/2003 |
| JP | 34-52577 | | 7/2003 |
| WO | 95/12491 | | 5/1995 |
| WO | 95/19752 | | 7/1995 |
| WO | 96/15968 | | 5/1996 |

OTHER PUBLICATIONS

Co-pending U.S. Appl. No. 10/598,265, filed Aug. 23, 2006.

* cited by examiner

VELOCITY-CHANGING APPARATUS FOR WEB

This application is a continuation application of U.S. Non-Provisional application Ser. No. 10/598,265 filed on Aug. 23, 2006 now abandoned which is a 371 of International Application No. PCT/JP2005/003355 filed in Japan on Mar. 1, 2005, the entire contents of which are hereby incorporated by reference.

TECHNICAL FIELD

The present invention relates to a velocity-changing apparatus for a web, wherein predetermined processing can be added onto the web while the web is being transported.

BACKGROUND ART

When a processing such as bonding is added onto the web which is being carried, a certain amount of time for the processing is required. The time for processing can be gained by decreasing the speed of the whole production line, but it might lead to decreased production efficiency. Velocity-changing apparatuses and apparatuses for producing absorbent articles, in which apparatuses the velocity of the web can be slowed down during the processing of the web with the speed of the production line kept constant in order to increase the production efficiency, are heretofore known (for example, the following first and second patent documents).

[First patent document] U.S. Pat. No. 6,596,108 B2 (abstract)

[Second patent document] Japanese Patent No. 3,452,577 (FIG. 5, the nineteenth column) (WO 95/012491)

However, the patent documents fail to disclose the slow-down of the drum itself for processing or cutting the web, and fail to disclose cutting the web on the drum.

DISCLOSURE OF THE INVENTION

Generally, processing of the web by ultrasonic welding requires more time for processing than that by heat sealing. Therefore, introducing the ultrasonic welding in place of the heat sealing into the existing production line might cause slowdown of the production line as a whole, thereby decreasing the production efficiency.

An object of the present invention is to provide a new velocity-changing apparatus for a web that can be incorporated into the production line without decreasing the speed of the production line as a whole.

A velocity-changing apparatus of the present invention for changing a velocity of a continuous web, comprises: a drum for transporting (carrying) the continuous web at a transport velocity (carrying velocity) which is generally equal to a circumferential velocity (peripheral velocity) of the drum while changing the circumferential velocity periodically at least once per one rotation of the drum; a movable member disposed upstream of the drum for feeding the continuous web to the drum; and a cutter for cutting, on the drum, the continuous web being transported at the transport velocity which is generally equal to the circumferential velocity of the drum. The movable member moves according to the change of the circumferential velocity of the drum so that a feed velocity at which the continuous web is fed to the drum is generally equal to the transport velocity of the continuous web being transported by the drum.

In this velocity-changing apparatus, the rotational velocity of the drum is changed periodically while the continuous web is being transported by means of the rotation of the drum. Thus, the transport velocity of the continuous web, which is transported by the drum, is changed periodically. Furthermore, the movable member moves periodically so that the feed velocity of the continuous web decreases when the transport velocity of the continuous web on the drum decreases and that the feed velocity of the continuous web increases when the transport velocity of the continuous web on the drum increases. Thus, the continuous web on the drum or on the upstream side of the drum can be prevented from substantially slacking or shrinking.

In the present invention, the velocity-changing apparatus for the web may include only one drum or may include a plurality of drums. In a case where a plurality of the drums are provided, the processing of the continuous web may be carried out on one of the drums and the cutting of the continuous web may be carried out on another of the drums. In a case where a plurality of the drums are provided, it is preferred that the circumferential velocities of the drums are set substantially the same.

According to a preferred aspect of the present invention, the velocity-changing apparatus further comprises a processing device for processing the continuous web on the drum.

In this aspect, the continuous web on the drum can be processed when the circumferential velocity of the drum slows down, i.e., the transport velocity of the continuous web slows down, which allows for more time for processing. On the other hand, the transport velocity of the continuous web can be accelerated by accelerating the circumferential velocity of the drum when the processing is not performed, which makes the average transport velocity of the continuous web in conformity with the speed of the production line as a whole.

In this view, it is preferred that the processing device processes the continuous web when the transport velocity at which the drum transports the continuous web is lower than an average circumferential velocity of the drum. The processing device may be a welder for welding the continuous web.

According to another preferred aspect of the present invention, the cutter cut the continuous web when the transport velocity at which the drum transports the continuous web is lower than the average circumferential velocity of the drum. In this aspect, the accuracy of cutting can be improved.

According to another preferred aspect of the present invention, the velocity-changing apparatus further comprises a receiving device for receiving a cut-off web cut off by the cutter and then transporting the cut-off web. A velocity at which the received cut-off web is transported by the receiving device when the receiving device receives the cut-off web is set larger than the transport velocity of the continuous web at the time of cutting. Thereby, a tip end of the continuous web and a rear end of the cut-off web are spaced from each other.

In this aspect, after the cutter cuts the continuous web, the cut-off web produced by cutting the continuous web can be transported (moved) at a velocity which is higher than the circumferential velocity of the drum at the time of the cutting. Furthermore, since the receiving device transports (moves) the cut-off web at such a higher velocity, the tip end of the continuous web can get away from the rear end of the cut-off web. Thus, even when the transport velocity of the continuous web is accelerated after this spacing, the front end of the continuous web can be prevented from interfering with the rear end of the cut-off web.

In the present invention, regarding the cycle of the change of the circumferential velocity of the drum, the circumferential velocity may be changed once per one rotation of the drum, or may be changed two or more times per one rotation of the drum. The number of the change of the circumferential velocity per one rotation of the drum may be set according to the position of the web to be processed or according to the type of the article to be produced.

DESCRIPTION OF THE REFERENCE NUMERALS

Figure 1:
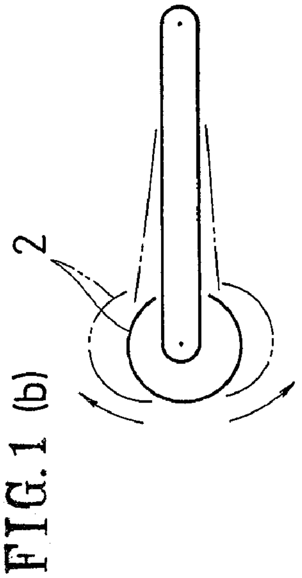
FIG. 1(*a*) is a schematic side view showing a velocity-changing apparatus for web according, to the first embodiment of the present invention and FIGS. 1(*b*), 1(*c*) are schematic side views each showing an example of a path of motion of a movable roller.
Figure 1:
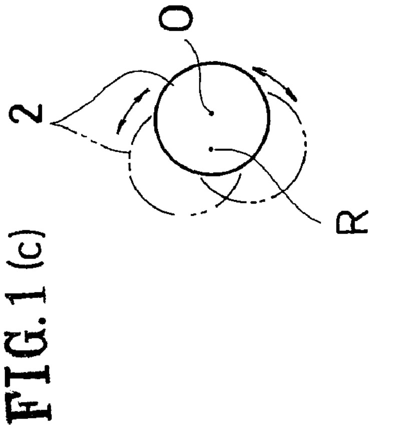
Figure 1:
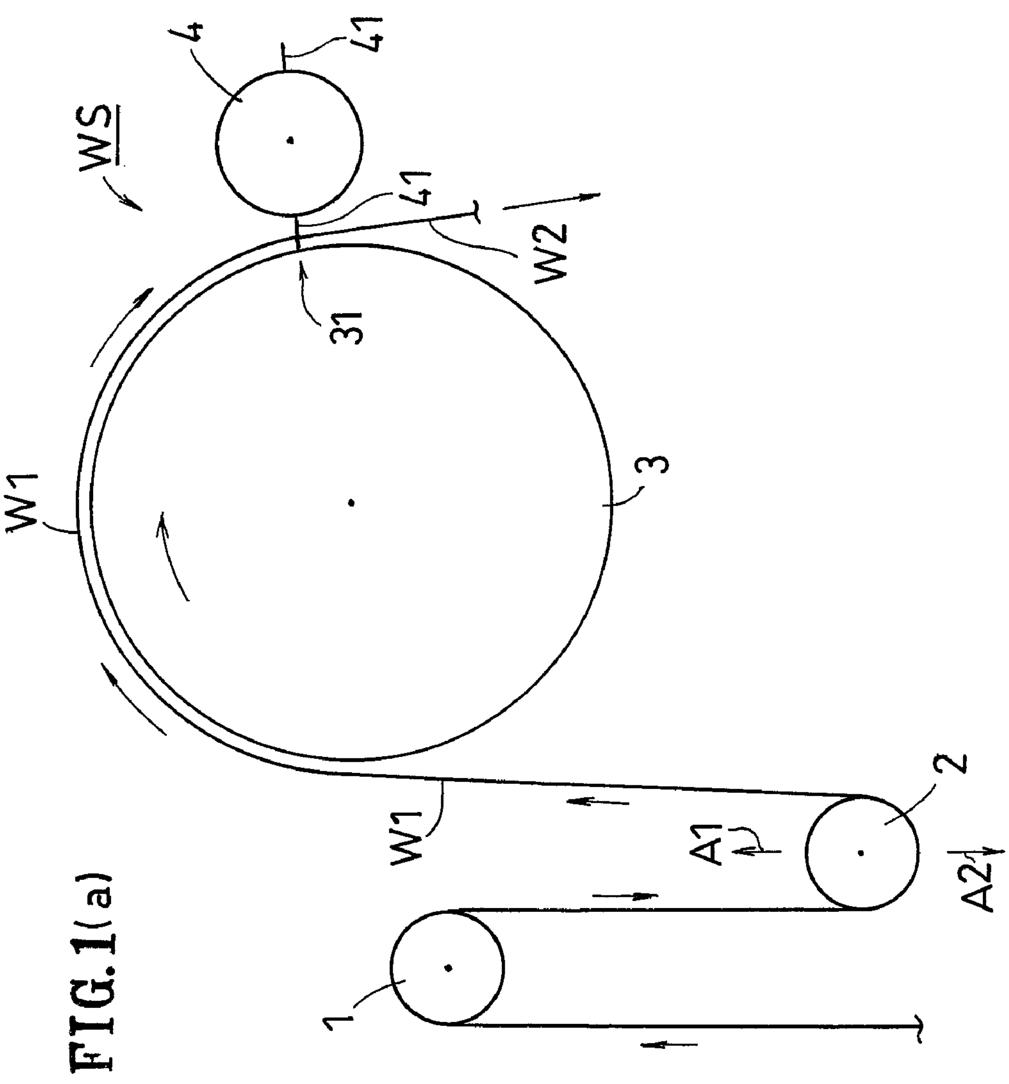

2: Movable roller (movable member)
3, 3A: Work drum
4: Cutter roller
6: Processing device
50: Receiving device
W1: Continuous web
W2: Cut-off web
WS: Velocity-changing apparatus for web
V(θ): Circumferential velocity
Va: Average circumferential velocity

BEST MODE FOR CARRYING OUT THE INVENTION

The present invention will be understood more clearly from the following description of preferred embodiments taken in conjunction with the accompanying drawings. However, it will be appreciated that the embodiments and the drawings are given for the purpose of mere illustration and explanation and that the scope of the present invention is to be defined by the appended claims. In the accompanying drawings, the same reference numerals denote the same or corresponding elements throughout several figures.

First Embodiment

Embodiments of the present invention will now be described with reference to the drawings.

FIG. 1 shows the first embodiment, which includes a velocity-changing apparatus WS for web.

According to this embodiment, the velocity-changing apparatus WS includes a movable roller 2 (an example of movable member), a work drum 3 and a cutter roller 4. A fixed roller 1 may be located upstream of the movable roller 2. A continuous web W1 is fed successively to the work drum 3 from the movable roller 2, which is located upstream of the work drum 3. On the outer circumferential surface of the cutter roller 4, two blades 41 are provided. One or more blade rests (beds) for receiving the blades 41 may be provided on the work drum 3.

The work drum 3 can rotate while changing periodically its circumferential velocity V(θ) (peripheral velocity). Thus, in a case where a processing device is provided on the work drum 3, the work drum 3 enables the continuous web W1 to move at a velocity which is commensurate with the processing ability of the processing device. The work drum 3 may have a structure wherein the continuous web W1 can be held thereon by suction. If a structure for sucking the continuous web W1 by means of vacuum is employed, a suction hole (not shown) may be provided on the work drum 3.

The work drum 3 is rotatably driven by a motor, for example, a servo motor. By changing the rotational velocity of the motor according to the phase (rotation angle) of the work drum 3, the circumferential velocity of the work drum 3 can be changed according to a position of the processing device.

The change of the circumferential velocity of the work drum 3 may be realized by employing a method wherein the velocity is changed by means of combination of a main motor for rotatably driving the work drum 3 and a servo motor for changing the velocity (for example, Japanese Patent Laid-Open No. 2003-145485).

The cutter roller 4 can cut the continuous web W1 on the work drum 3 after some processing is added onto the continuous web W1. Since the continuous web W1 is cut by the cutter roller 4, a cut-off web W2 located downstream of the cutting position 31 can move at a different velocity from the continuous web W1 located upstream of the cutting position 31.

Now, the transport velocity (circumferential velocity) of the continuous web W1 at the time of cutting the continuous web W1 is indicated by V1, for example. Even when, after cutting, the transport velocity (carrying velocity) of the continuous web W1 located upstream of the cutting position 31 shifts to a velocity V2 which is lower than or higher than V1, the transport velocity (carrying velocity) of the cut-off web W2 located downstream of the cutting position 31 won't be affected by the shifted velocity V2. That is, the transport velocity of the cut-off web W2 is independent from the circumferential velocity of the work drum 3, i.e., the transport velocity of the continuous web W1. In this case, in order to move the downstream cut-off web W2 at a different velocity from the circumferential velocity V1 of the work drum 3, it is preferred that the cut-off web W2 is released from the work drum 3 and is carried by another carrying device or that the cut-off web W2 is subject to some force from another carrying device if not released from the work drum 3.

If the transport velocity of the cut-off web W2 is higher than the transport velocity V1 of the continuous web W1 at the time of cutting, the tip end (front end) of the continuous web W1 and the rear end of the cut-off web W2 get spaced apart from each other. Thus, even when the transport velocity of the continuous web is increased to be higher than the transport velocity of the cut-off web after this spacing, the front end of the continuous web can be prevented from interfering with the rear end of the cut-off web.

Figure 3B:
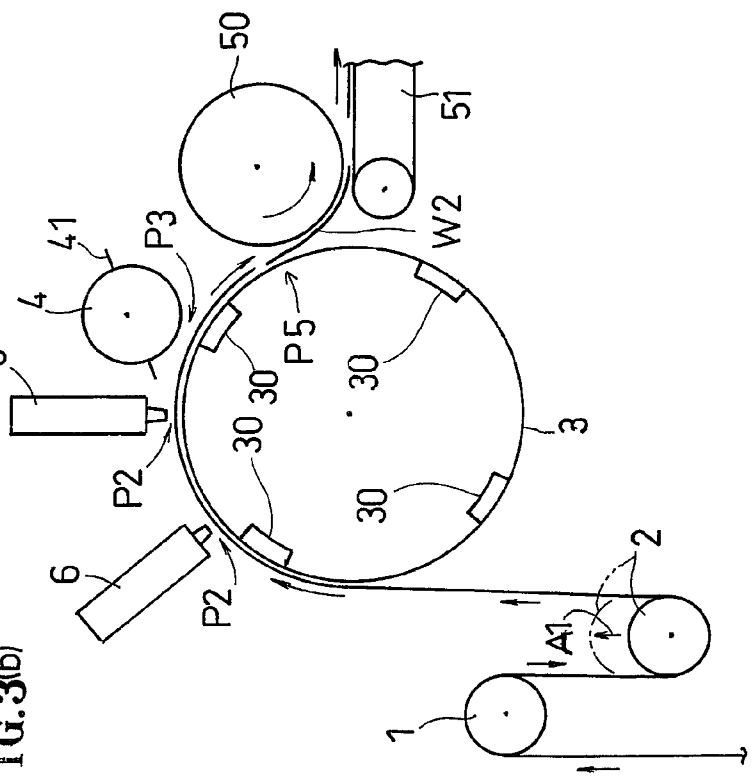
FIGS. 3(*a*), 3(*b*) are schematic side views each showing a velocity-changing apparatus for web according to the second embodiment of the present invention.
Figure 3A:
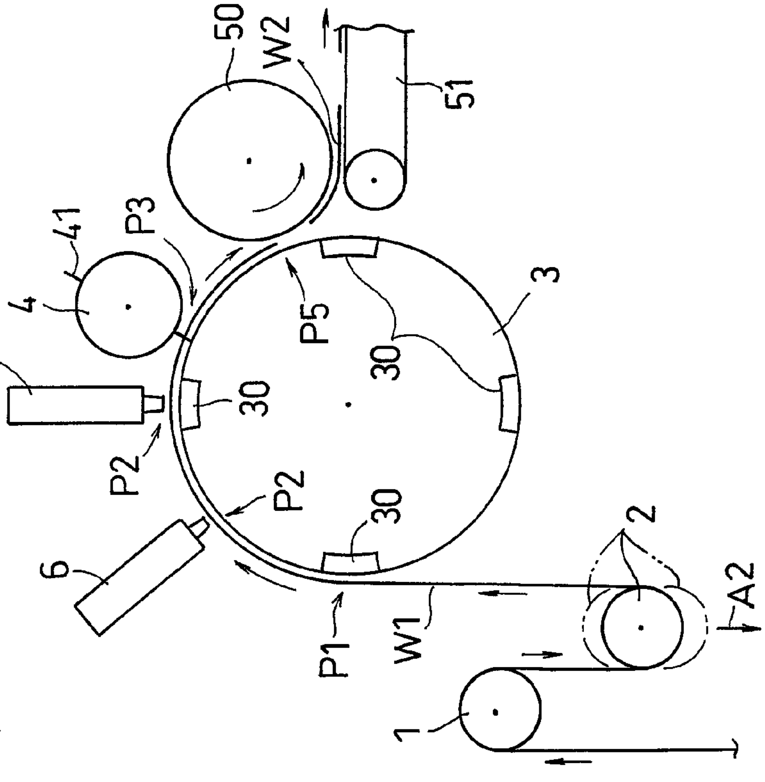

A receiving device 50 shown in FIG. 3(*a*) or FIG. 3(*b*) may be employed as such downstream carrying device. The receiving device 50 receives the cut-off web W2 from the work drum 3 by suction or by mechanical means, immediately after the cutter roller 4 cut the continuous web W1. The work drum 3 may stop its sucking action when the work drum 3 hands over the cut-off web W2 to the receiving device 50, so as to make the cut-off web W2 easily unstick from the work drum 3.

If the circumferential velocity V(θ) becomes V4 that is lower than the feed velocity at which the movable roller 2 shown in FIG. 1(*a*) feed the continuous web W1 to the work drum 3, the continuous web W1 would be slacked between the movable roller 2 and the work drum 3. Such slacking brings about a negative effect on the flow (transport) of the continuous web W1, because the continuous web W1 may get tangled up, for example, if the slacked portion is long. In order to restrain such slacking, the movable roller 2 reciprocates according to the change of the circumferential velocity of the work drum 3. Accordingly, the feed velocity at which the continuous web W1 is fed to the work drum 3 is kept generally equal to the circumferential velocity of the work drum 3, i.e., the transport velocity of the continuous web W1 on the work drum 3.

The relationship between the move of the movable roller 2 and the change (acceleration) of the circumferential velocity V(θ) of the work drum 3 is as shown by the following expression (1).

$$2 \cdot dx/dt \approx dV(\theta) \quad (1)$$

dt: minute period of time dx: amount of displacement of the movable roller 2 with respect to the work drum 3 per minute period of time dV(θ): variation (acceleration) of the circumferential velocity of the work drum 3 per minute period of time That is, a value obtained by dividing the amount of displacement dx of the movable roller 2 with respect to the work drum 3 per minute period of time dt by the minute period of time dt and then doubling the divided amount is generally equal to the acceleration dV(θ) of the work drum 3.

For example, when the movable roller 2 gets near to the work drum 3 (the movable roller 2 moves in the feed direction A1 of the continuous web W1, and therefore dx>0), the feed velocity of the continuous web W1 is increased (accelerated) and it becomes possible to increase (accelerate) the circumferential velocity V(θ) of the work drum 3 according to the increased feed velocity. On the other hand, when the movable roller 2 gets away from the work drum 3 (the movable roller 2 moves in the opposite direction A2 from the feed direction A1 of the continuous web W1, and therefore dx<0), the feed velocity of the continuous web W1 is decreased (slowed down) and it becomes possible to decrease (slow down) the circumferential velocity V(θ) of the work drum 3 according to the decreased feed velocity.

As shown in FIG. 1(*b*), the movable roller may be moved by swinging an arm to which the movable roller 2 is fixed. Alternatively, as shown in FIG. 1(*c*), the movable roller 2 may be moved by pivoting the movable roller 2 about its pivot center R, which is different from and is located eccentrically to the center O of rotation of the movable roller 2

Figure 2:
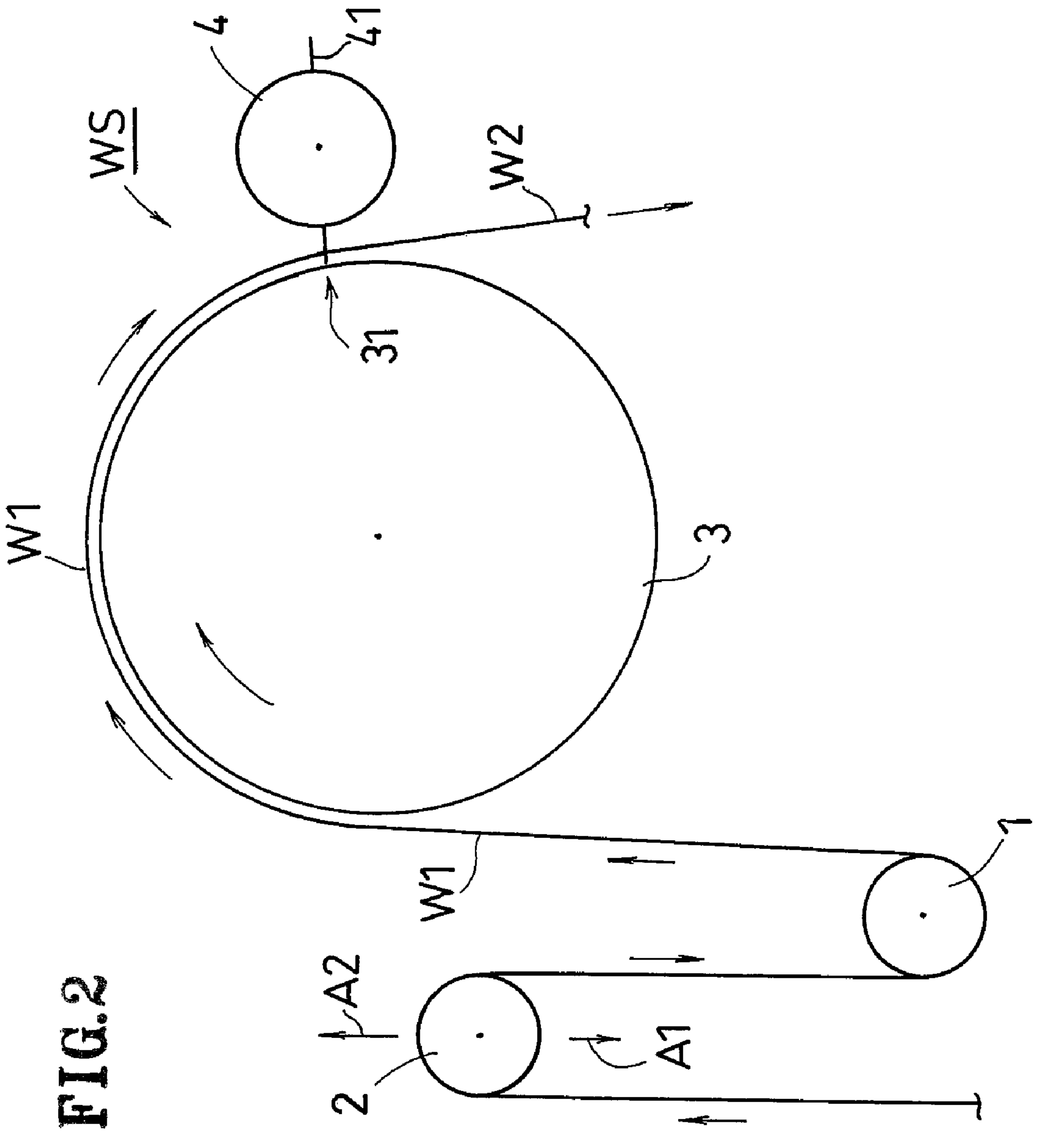
FIG. 2 is a schematic side view showing a velocity-changing apparatus for web according to a modified embodiment of the present invention.

The fixed roller 1 and the movable roller 2 may be arranged as shown in FIG. 2, in which case the relationship between the moving direction of the movable roller 2 and both the feed velocity of the continuous web W1 and the circumferential velocity of the work drum 3 is reversed from that in the above mentioned velocity-changing apparatus of FIG. 1(*a*).

Second Embodiment

The velocity-changing apparatus of the present invention may include a processing device. The processing device is capable of carrying out steps of cutting, forming holes, sealing, attaching or applying something, or the like. For example, in a case of welding or sealing the continuous web W1, ultrasonic welding means or heat sealing means may be employed thereto. Hereinafter, the second embodiment, in which ultrasonic welding means is used, will be described with reference to FIGS. 3(*a*), 3(*b*).

At least one main body of the processing device 6 is located around the work drum 3. As shown in FIGS. 3(*a*), 3(*b*), the work drum 3 may include a plurality of anvils (receiving beds) 30. In addition, the work drum 3 may hold the continuous web W1 by suction or by mechanical means at the anvils 30 and/or a portion other than the anvils 30.

As shown in FIG. 3(*a*), the continuous web W1 is received by the work drum 3 at a receiving position P1 of the work drum 3 and is processed at processing positions P2, P2 by the processing device 6. The processing device 6 adds processing onto a portion of a region of the continuous web W1, which region is placed on the anvil 30. Then, the continuous web W1 is cut by the cutter roller 4 at the cutting position P3. At the time of this cutting, the circumferential velocity of the cutter roller 4 may be generally equal to the circumferential velocity of the work drum 3.

As shown in FIG. 3(*b*), the cut-off web, which has been produced by cutting the continuous web, is received by the receiving device 50 at a hand-over position P5, and then, is placed onto the conveyor 51.

Generally, in a case of processing the web by ultrasonic welding, it is necessary to set the line speed (moving velocity of the web) at the processing position lower than in a case of processing the web by heat sealing. Therefore, if the ultrasonic welding device is incorporated into the existing production line in place of the heat sealing device, it is necessary to lower the velocity of the web at the processing position.

Accordingly, in this embodiment, the moving velocity of the continuous web W1 at the time of processing is lowered by the movable roller 2 and the work drum 3, as above mentioned. That is, as shown in FIG. 3(*a*), at the time of processing, the movable roller 2 moves in the opposite direction A2 so as to decrease the feed velocity of the continuous web W1 and, concurrently, the circumferential velocity of the work drum 3 is decreased so that the transport velocity of the continuous web W1 on the work drum 3 is decreased. After processing, the movable roller 2 moves in the feed direction A1 so as to increase the feed velocity of the continuous web W1 and, concurrently, the circumferential velocity of the work drum 3 is increased so that the transport velocity of the continuous web W1 on the work drum 3 is increased. Thus, the velocity-changing apparatus for the web enables incorporation of the ultrasonic welding device into the existing production line without lowering the speed of the production line as a whole.

A plurality of the processing devices 6, 6 may be arranged around the work drum 3, which makes it possible to apply efficiently the ultrasonic energy onto portions of the web to be welded, and therefore such configuration can be expected to lead to more speed-up of the production line.

Figure 7A:
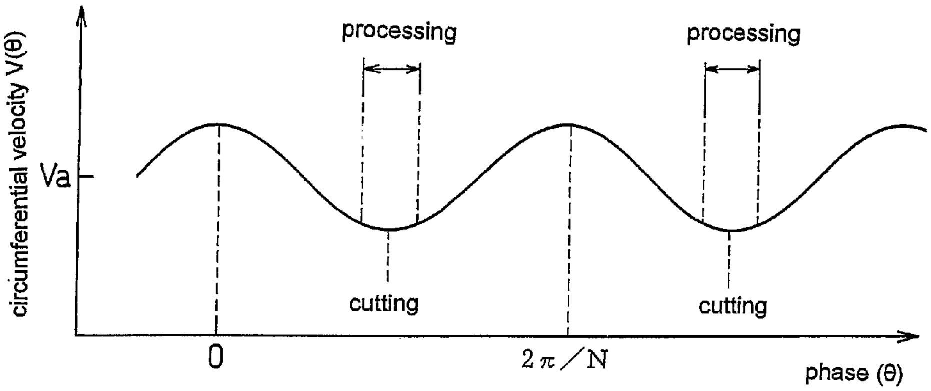
FIGS. 7(*a*), 7(*b*), 7(*c*) are characteristic curves each showing a change of a circumferential velocity of a drum.
Figure 7B:
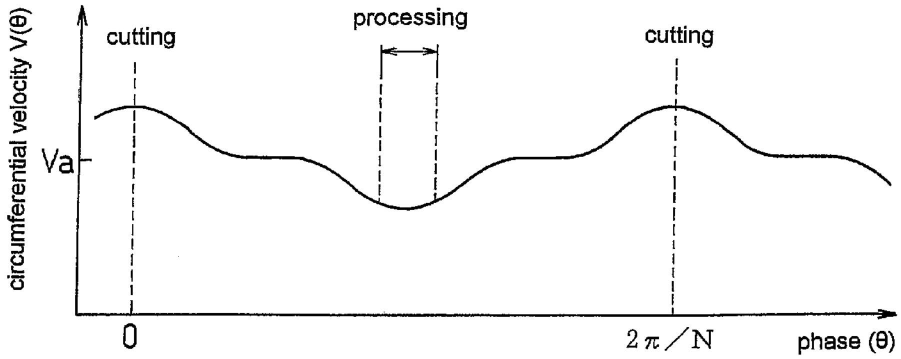
Figure 7C:
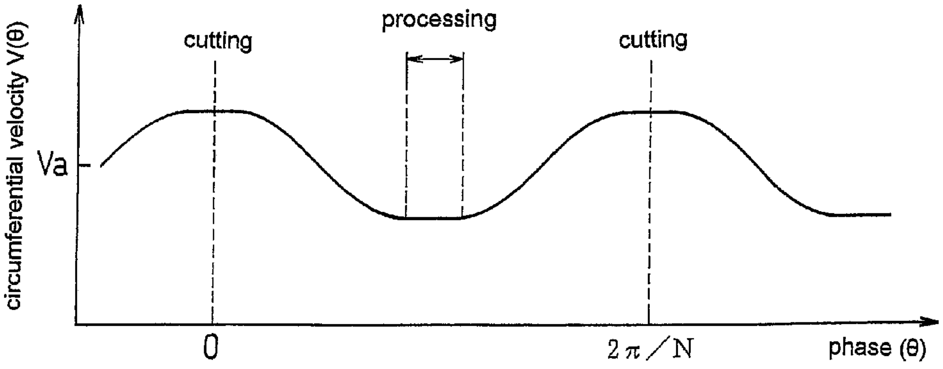

The circumferential velocity V(θ) of the work drum 3 changes periodically according to the phase θ of the work drum 3. The relationship between the circumferential velocity V(θ) and the phase θ may be defined by various functions. For example, the circumferential velocity V(θ) may change according to simple sine curve, as shown in FIG. 7(*a*). If the movable roller 2 stops temporarily at the center of moving (a position indicated by solid line of the movable roller 2 in FIG. 3(*a*)), the work drum 3 may be controlled so as to rotate, temporarily, at a constant circumferential velocity, which is equal to the average velocity Va, as shown in FIG. 7(*b*). If the movable roller 2 stops temporarily at the ends of moving (positions indicated by two-dot chain line of the movable roller 2 in FIG. 3(*a*)), the work drum 3 may be controlled so as to rotate, temporarily, at a constant circumferential velocity when the circumferential velocity V(θ) reaches its minimum or its maximum, as shown in FIG. 7(*c*).

The processing by the processing device 6 may be carried out while the circumferential velocity V(θ) of the work drum 3 is lower than the average circumferential velocity Va of the work drum 3. This processing may also be carried out while the circumferential velocity V(θ) of the work drum 3 is generally equal to or slightly higher than the average circumferential velocity Va of the work drum 3, in addition to while the circumferential velocity V(θ) of the work drum 3 is lower than the average circumferential velocity Va of the work drum 3.

The cutting of the continuous web W1 by the cutter roller 4 may be carried out when the processing is carried out, as shown in FIG. 7(*a*), or may be carried out when the processing is not carried out, as shown in FIGS. 7(*b*), 7(*c*). In view of the accuracy of cutting, it is preferred that the cutting of the continuous web W1 by the cutter roller 4 is carried out while the circumferential velocity V(θ) of the work drum 3 is lower than the average circumferential velocity Va of the work drum 3.

The rotation angle per cycle (period) of velocity-changing of the work drum 3, i.e., 2π (pi)/N, may be, for example, an angle obtained by dividing 2π by the number m of the anvils provided on the work drum 3. If a plurality of the processing devices 6 are provided, the rotation angle 2π/N may be, for example, an angle obtained by dividing 2π by the product of the number m of the anvils and the number of the processing devices 6. That is, the rotation angle 2π/N may be a value obtained by the following expressions.

$$2\pi/N=2\pi/m \quad (2)$$

$$2\pi/N=2\pi/(m\cdot n) \quad (3)$$

The receiving device 50 shown in FIG. 3 may receive the cut-off web W2 when the circumferential velocity V(θ) of the work drum 3 is at maximum. In this way, the cut-off web W2 can be prevented from slacking at the hand-over position P5 of the cut-off web W2 when the receiving device 50 receives the cut-off web W2 from the work drum 3.

Third Embodiment

Figure 4:
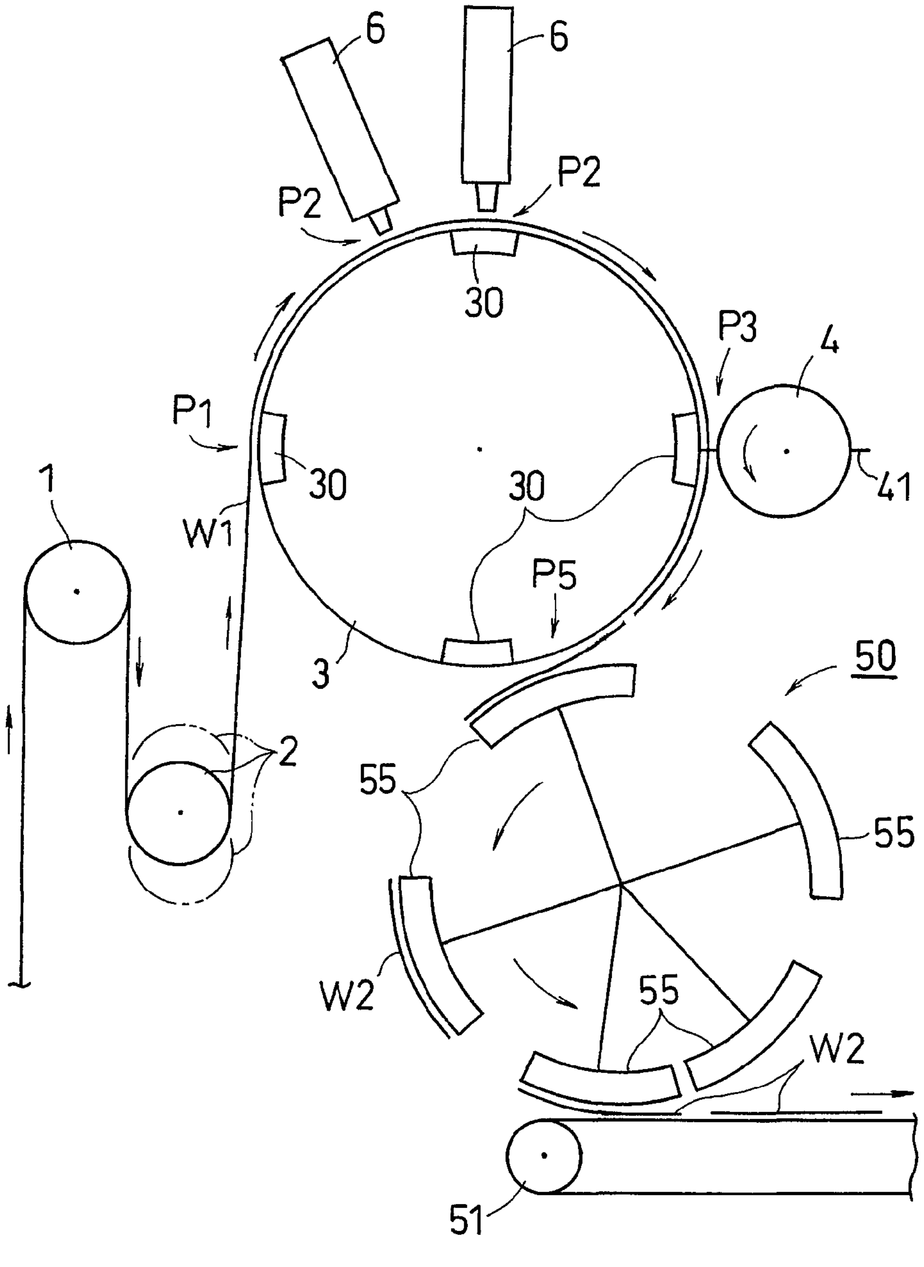
FIG. 4 is a schematic side view showing a velocity-changing apparatus for web according to the third embodiment of the present invention.

FIG. 4 shows the third embodiment.

In this embodiment, as shown in FIG. 4, a adjustment drum having a plurality of pads 55 is employed as the receiving device 50, in which drum the interval between the pads is adjusted by rotating the pads 55 while changing their circumferential velocity. For example, the circumferential velocity of the pad 55 may reach its maximum at the hand-over position P5 and then be decreased to a velocity commensurate with the velocity of the conveyor 51 when the cut-off web W2 is transferred to the conveyor 51. A structure as disclosed in Japanese Laid-Open Patent Publication No. 2002-345889 may be employed for the adjustment drum.

Fourth Embodiment

Figure 5:
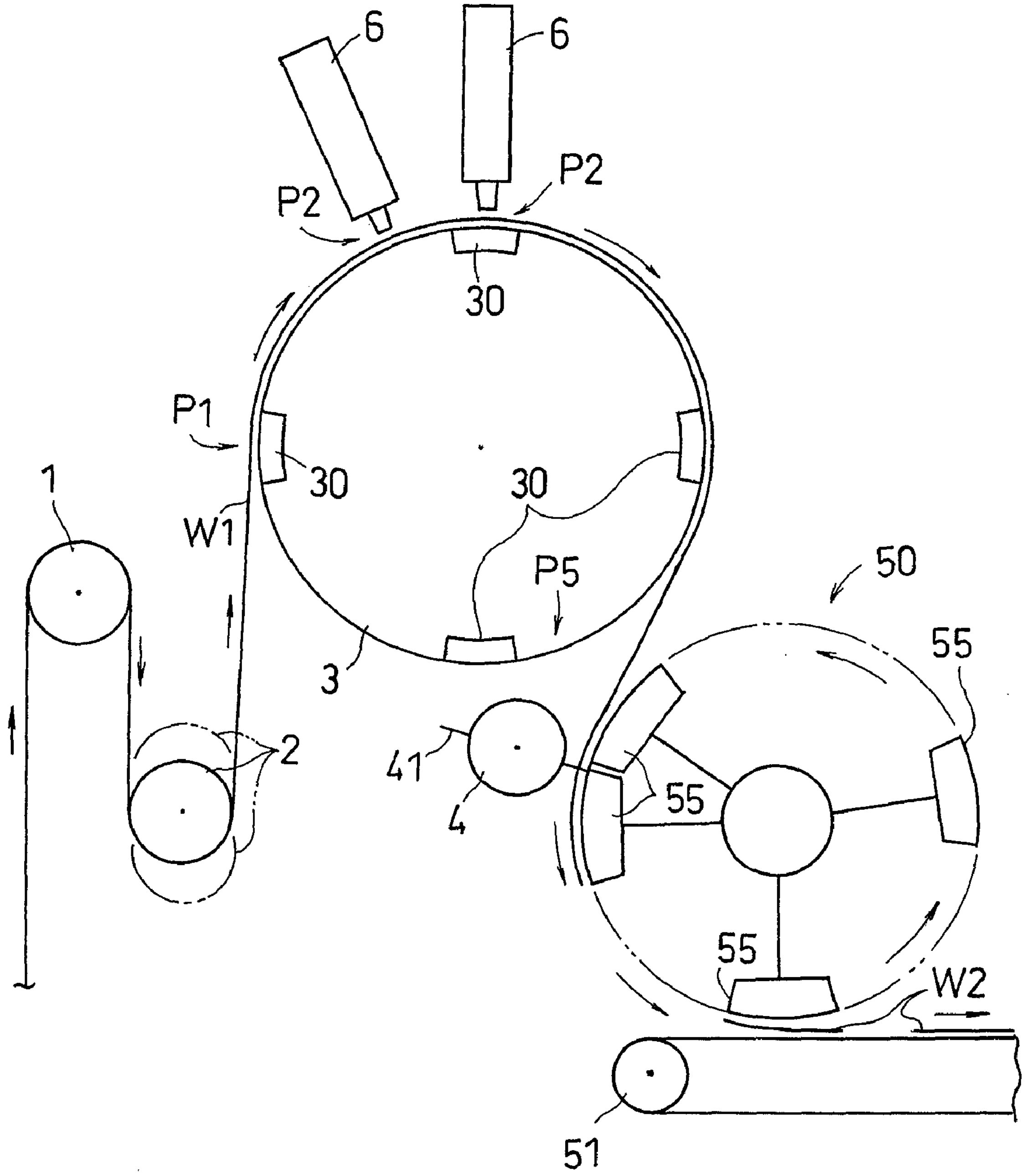
FIG. 5 is a schematic side view showing a velocity-changing apparatus for web according to the fourth embodiment of the present invention.

FIG. 5 shows the fourth embodiment.

In this embodiment, as shown in FIG. 5, the cutter roller 4 cut the continuous web W1, which has been released from the work drum 3, on the pad 55 of the receiving device 50.

The cutting position at which the continuous web is cut is not limited to such position. For example, the continuous web W1, which has been released from the work drum 3, may be cut by the cutter roller 4 at a position between the work drum 3 and the receiving device 50 for receiving the continuous web W1 from the work drum 3.

Fifth Embodiment

Figure 6:
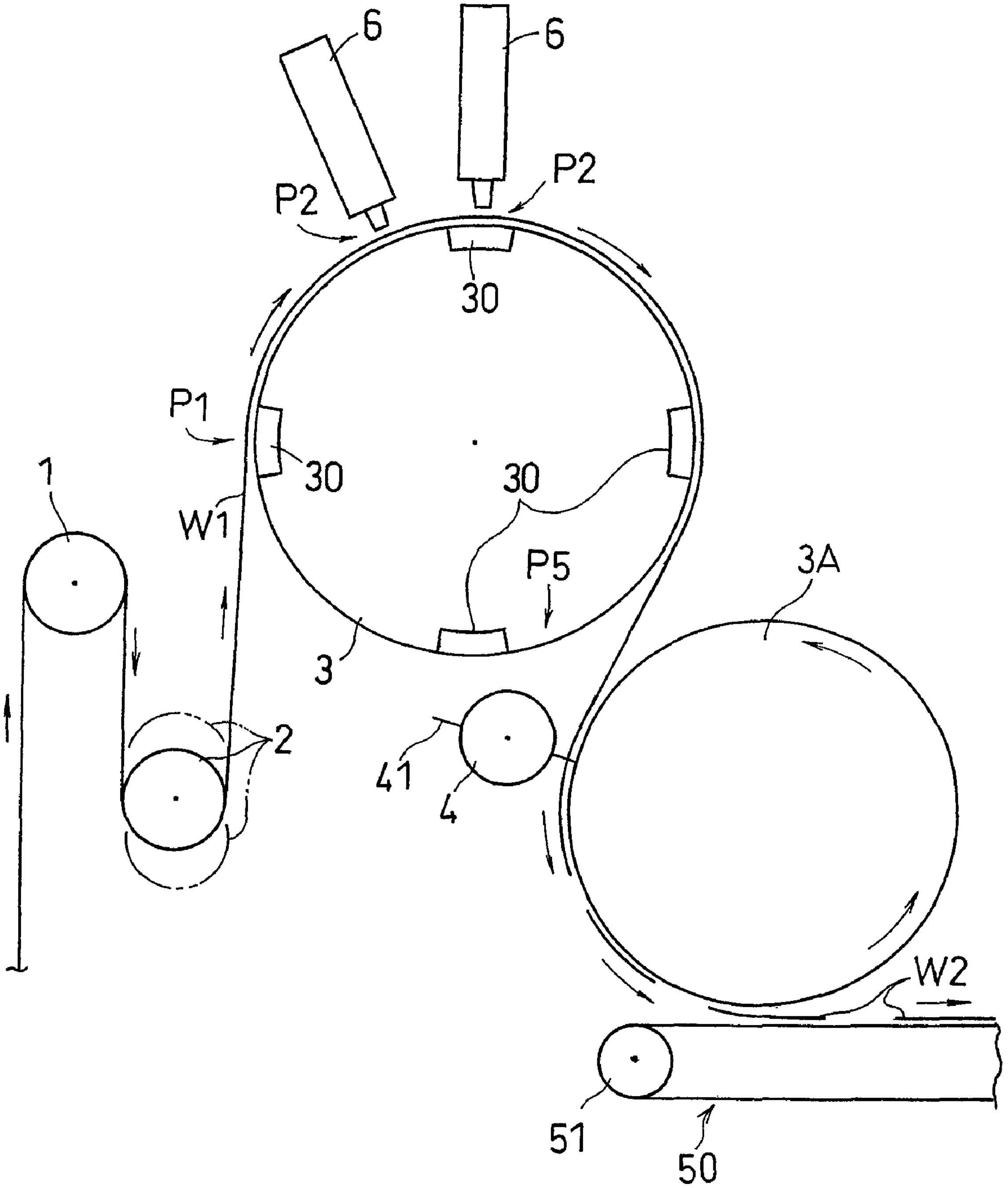
FIG. 6 is a schematic side view showing a velocity-changing apparatus for web according to the fifth embodiment of the present invention.

FIG. 6 shows the fifth embodiment.

As shown in FIG. 6, the velocity-changing apparatus of this embodiment includes the first work drum 3 and the second work drum 3A located downstream of the first work drum 3. The second work drum 3A is an anvil roller and receives the continuous web W1 from the first work drum 3. The continuous web W1 is cut on the second work drum 3A by the cutter roller 4.

In this embodiment, preferably, the second work drum 3A rotates while changing periodically its circumferential velocity in synchronism with the first work drum 3. That is, it is preferred that the circumferential velocity of the second work drum 3A is controlled to be generally equal to the circumferential velocity of the first work drum 3. In this case, the transport velocity of the continuous web W1 on the first work drum 3 is generally equal to the transport velocity of the continuous web W1 on the second work drum 3A.

The cut-off web W2, which is produced by cutting the continuous web W1 on the second work drum 3A, is handed over to the conveyor (receiving device) 51 and then transported downstream.

While preferred embodiments of the present invention have been described above with reference to the drawings, obvious variations and modifications will readily occur to those skilled in the art upon reading the present specification.

For example, three or more work drum may be used. The movable member is not limited to the roller. A web guider may be provided for carrying the web smoothly.

Thus, such variations and modifications shall fall within the scope of the present invention as defined by the appended claims.

Industrial Applicability

The present invention is preferably applicable to facilities where the web is processed successively, for example, production facilities for producing disposable worn articles, building materials, medical materials or the like.

The invention claimed is:

1. A method for processing a continuous web for composing a disposable worn article comprising the steps of:

feeding the continuous web at a feed velocity to a rotating drum from a movable member, the rotating drum having a circumferential surface and a circumferential velocity;

transporting the continuous web by the rotating drum at a transport velocity, the continuous web contacting and winding around at least a portion of the circumferential surface of the rotating drum, wherein the transport velocity is generally equal to the circumferential velocity of the rotating drum;

changing the circumferential velocity of the rotating drum periodically at least once per rotation of the drum;

moving the movable member according to the change of the circumferential velocity of the drum to feed the continuous web to the rotating drum so that the feed velocity is generally equal to the transport velocity of the continuous web as it is being transported by the rotating drum;

welding the continuous web with a welder on the rotating drum when the transport velocity is lower than an average circumferential velocity of the drum; and cutting the welded continuous web on the rotating drum with a cutter positioned downstream of the welder to form at least one cut-off web when the transport velocity is lower than the average circumferential velocity of the drum.

2. The method of claim 1 wherein in the step of welding the continuous web, an ultrasonic welding is carried out onto the continuous web with an ultrasonic energy applied onto the continuous web.

3. The method of claim 2 wherein the circumferential velocity of the drum is changed by means of combination of a main motor for driving the drum and a servo motor for changing the circumferential velocity of the drum.

4. The method of claim 1 wherein the step of cutting is carried out at a time when the step of welding is carried out.

5. The method of claim 1 wherein the step of cutting is carried out at a time different from a time at which the step of welding is carried out.

6. The method of claim 1, the method further comprising the step of receiving the cut-off web, the step of receiving being carried out by a receiving device, the receiving device receiving the cut-off web cut by the cutter from the rotating drum and then transporting the cut-off web, wherein when the receiving device receives the cut-off web, a velocity at which the received cut-off web is transported by the receiving device is larger than the transport velocity of the continuous web when the continuous web is cut, whereby a tip end of the continuous web gets spaced apart from a rear end of the cut-off web.

7. A method for processing a continuous web for composing a disposable worn article comprising the steps of:

feeding the continuous web at a feed velocity to a rotating drum from a movable member, the rotating drum having a circumferential surface and a circumferential velocity;

transporting the continuous web by the rotating drum at a transport velocity, the continuous web contacting and winding around at least a portion of the circumferential surface of the rotating drum, wherein the transport velocity is generally equal to the circumferential velocity of the rotating drum;

changing the circumferential velocity of the rotating drum periodically at least once per rotation of the drum;

moving the movable member according to the change of the circumferential velocity of the drum to feed the continuous web to the rotating drum so that the feed velocity is generally equal to the transport velocity of the continuous web as it is being transported by the rotating drum; and welding the continuous web with a welder on the rotating drum when the transport velocity is lower than an average circumferential velocity of the drum, wherein in the step of welding the continuous web, an ultrasonic welding is carried out onto the continuous web with an ultrasonic energy applied onto the continuous web, and further comprising a step of cutting the continuous web with a cutter on the rotating drum to form at least one cut-off web when the transport velocity is lower than the average circumferential velocity of the drum, wherein the step of cutting the continuous web is carried out when the step of welding the continuous web is carried out.

* * * * *